United States Patent
Lee et al.

(10) Patent No.: US 7,347,590 B2
(45) Date of Patent: Mar. 25, 2008

(54) LENS USED FOR LIGHT-EMITTING DIODE

(75) Inventors: I-Chang Lee, Tainan County (TW); Shen-Yin Tsai, Tainan County (TW)

(73) Assignee: Chi Lin Technology Co., Ltd, Tainan County (TW)

( * ) Notice: Subject to any disclaimer, the term of this patent is extended or adjusted under 35 U.S.C. 154(b) by 103 days.

(21) Appl. No.: 11/274,191

(22) Filed: Nov. 16, 2005

(65) Prior Publication Data

US 2007/0030572 A1 Feb. 8, 2007

(30) Foreign Application Priority Data

Aug. 5, 2005 (TW) ............................. 94126626 A

(51) Int. Cl.
*F21V 5/00* (2006.01)
(52) U.S. Cl. ..................................... 362/327
(58) Field of Classification Search ............ 362/327, 362/317; 385/146; 257/98
See application file for complete search history.

(56) References Cited

U.S. PATENT DOCUMENTS 6,679,621 B2 * 1/2004 West et al. ................. 362/327
6,972,439 B1 * 12/2005 Kim et al. .................... 257/98
7,142,769 B2 * 11/2006 Hsieh et al. ................ 385/146

* cited by examiner

*Primary Examiner*—Sandra O'Shea
*Assistant Examiner*—James W Cranson, Jr.
(74) *Attorney, Agent, or Firm*—Reed Smith LLP; Stanley P. Fisher, Esq.; Juan Carlos A. Marquez, Esq.

(57) ABSTRACT

A lens used for a light-emitting diode (LED) includes a body having an axis and a retaining part, wherein the body of the lens is symmetrical about the axis. The lens is mounted onto an LED and further includes a first lens part and a second lens part. When entering into the first lens part, light rays will be totally reflected through the first lens part and the light rays emitted from the first lens part will approximately parallel to the axis. When the light rays emitted from the first lens part enter into the second lens part, they will be totally reflected, and the light rays emitted from the second lens part will be approximately perpendicular to the axis. Thus, the lens has a structure that may control the emitting direction of light emitted from an LED.

14 Claims, 2 Drawing Sheets

LENS USED FOR LIGHT-EMITTING DIODE

CROSS-REFERENCE TO RELATED APPLICATIONS

This non-provisional application claims priority under 35 U.S.C. § 119(a) on Patent Application No(s). 94126626 filed in Taiwan, R.O.C. on Aug. 5, 2005, the entire contents of which are hereby incorporated by reference.

BACKGROUND OF THE INVENTION

1. Field of the Invention

The present invention relates a lens used for a light-emitting diode (LED), more specifically, to a lens having a structure that may control the emitting direction of light emitted from a LED.

2. Related Art

Nowadays, LED has been used as the light source for many types of electronic appliances. The reason why LED has been widely used is that it has low power consumption and is environmentally friendly. Moreover, it uses less expensive wires. Compared with incandescent lights, LED has a high reaction speed. Further, LED is more durable and takes less space than other light sources when used in normal condition.

The LED at earlier age had the disadvantage that it had a lower light intensity than other light sources. Recently, with the ongoing development by manufacturers, LEDs with high light intensity have been developed. However, the conventional lens used for LEDs may not control the emitting direction of light well; as a result, the light emitted from LEDs is not focused and is scattered. In order to obtain more-focused and high-intensity light, manufacturers have to combine several LEDs to increase light intensity, although doing so increases cost.

Therefore, with the conventional lens structure, the intensity of the light emitted from LEDs cannot be increased. How to design a new lens that can increase the light intensity of LEDs has been the goal of researchers in the art.

SUMMARY OF THE INVENTION

In order to solve the problems described above, exemplary embodiments of the present invention provides a lens used for a light-emitting diode (LED), which may control the emitting direction of light from LEDs well and solve the problem that a plurality of LEDs are needed to improve light intensity at a higher cost.

In order to achieve the objects described above, a lens used for LEDs according to exemplary embodiments of the present invention includes a body having a central axis, wherein the body of the lens is symmetrical about the central axis. The lens is mounted onto a LED through a retaining part and the retaining part is perpendicular to the central axis. The lens further includes a first lens part and a second lens part. A light guide housing is formed at the center of the first lens and formed by a first arc-shaped light guide surface and a second arc-shaped light guide surface. When light rays emitted from the LED enters the light guide housing, the light rays will be focused through the first light guide surface or will be refracted through the second light guide surface, and then will be totally reflected through the first lens part, and the light ray will be approximately perpendicular to the central axis. When the light rays totally reflected through the first lens part enter into the second lens part, the second lens part will totally reflect the light rays so that most light rays totally reflected through the second lens part will be approximately perpendicular to the central axis.

The first lens part of the lens 1 is about bowl-shaped and the second lens part of the lens is like M-shaped. The second lens part includes a V-shape portion containing the central axis on its middle and a linear portion extending outward from the central axis and paralleling to the central axis.

Further, the second lens part may include a V-shape portion containing the central axis on its middle and a linear portion extending outward from the central axis and keeping an angle with the central axis.

A lens used for an LED according to exemplary embodiments of the present invention may be made of a transparent material by means of means of diamond turning, injection molding, precision grinding, or casting.

The LED may be a red LED, a blue LED, a green LED, or a white LED.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1A:
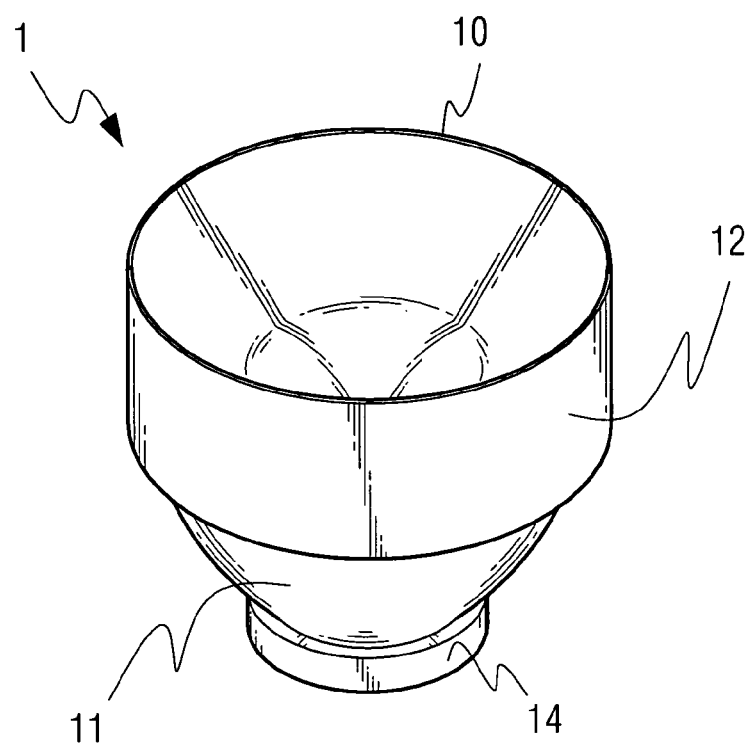
FIG. 1A is a three-dimensional view of a lens used for an LED according to an exemplary embodiment of the present invention.
Figure 1B:
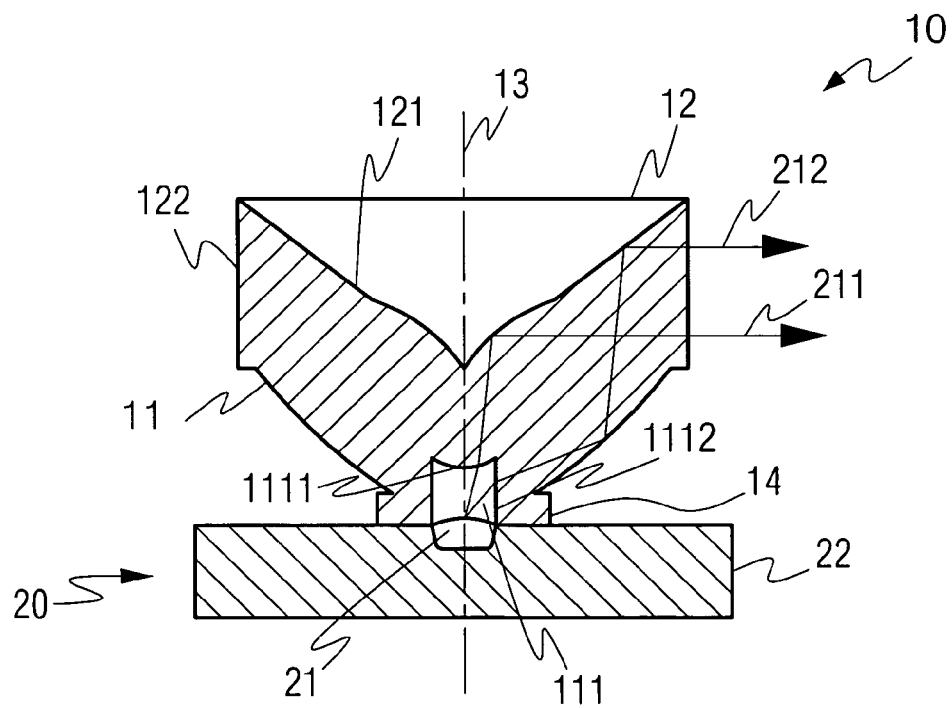
FIG. 1B is a cross-sectional view of a lens used for an LED according to an exemplary embodiment.

FIGS. 1A and 1B illustrate a lens used for an LED according to an exemplary embodiment of the present invention. The lens 1 includes a body 10 having a central axis 13 and a retaining part 14, wherein the body 10 of the lens 1 is symmetrical about the central axis 13. The lens 1 is mounted onto a light source package 20 by means of the retaining part 14. The light source package 20 includes an LED light source 21 and an encapsulating base 22. The retaining part 14 of lens 1 is perpendicular to the central axis 13. The lens 1 further comprises a first lens part 11 and a second lens part 12. The first lens part 11 is bowl-shaped with a light guide housing 111 at the center, wherein the light guide housing 111 is formed by a first concave-shaped light-emitting surface 1111 and a second arc-shaped light-emitting surface 1112. The second lens part 12 of lens 1 is approximately M-shaped. Besides, the second lens part 12 includes a V-shaped portion 121 containing the central axis 13 on its middle and a linear portion 122 extending outward from the central axis 13 and paralleling to the central axis 13.

Referring to FIG. 1A and FIG. 1B, when lens 1 is mounted onto LED 21 of the light source package 20 by means of the retaining part 14, the emitting direction of the light emitted from the LED 21 will be controlled well by the first lens part 11 and the second lens part 12 of lens 1. More specifically, when the light rays 211 and 212 emitted from the LED 21 enter into the light guide housing 111, the light ray 211 is focused through the first light guide surface 1111, and the light ray 212 is refracted through the second light-emitting surface 1112 and thus avoid light leakage from above the lens 1. The light ray 212 refracted through the second light-emitting surface 1112 is further totally reflected through the first lens part 11 such that most light rays emitted from the first lens part 11 are approximately parallel to the axis 13. In addition, when the light rays, such as the light ray 212, totally reflected from the first lens part 11 and the focused light rays, such as light ray 211, enter into the second lens part 12, the second lens part 12 will reflect all the light so that most light rays emitted from the second lens part 12 will be approximately perpendicular to the central axis 13. Besides, a fluorescent material may be applied to the light output surface of the second lens part 12 so that the light emitted from the lens 1 may be colorful. Further, because of the optical design, the light emitted from the LED 1 will be totally reflected through the first lens part 11 and the second lens part 12, or totally reflected through the second lens part 12 directly. The reflected light will be parallel or perpendicular to the central axis 13.

The second lens part 12 of the lens 1 according to an exemplary embodiment of the present invention is like M-shaped with a V-shape portion 121 containing the central axis 13 on its middle and a linear portion 122 extending outward from the V-shape and paralleling to the central axis 13. However, this design is not for limiting the present invention.

Figure 2A:
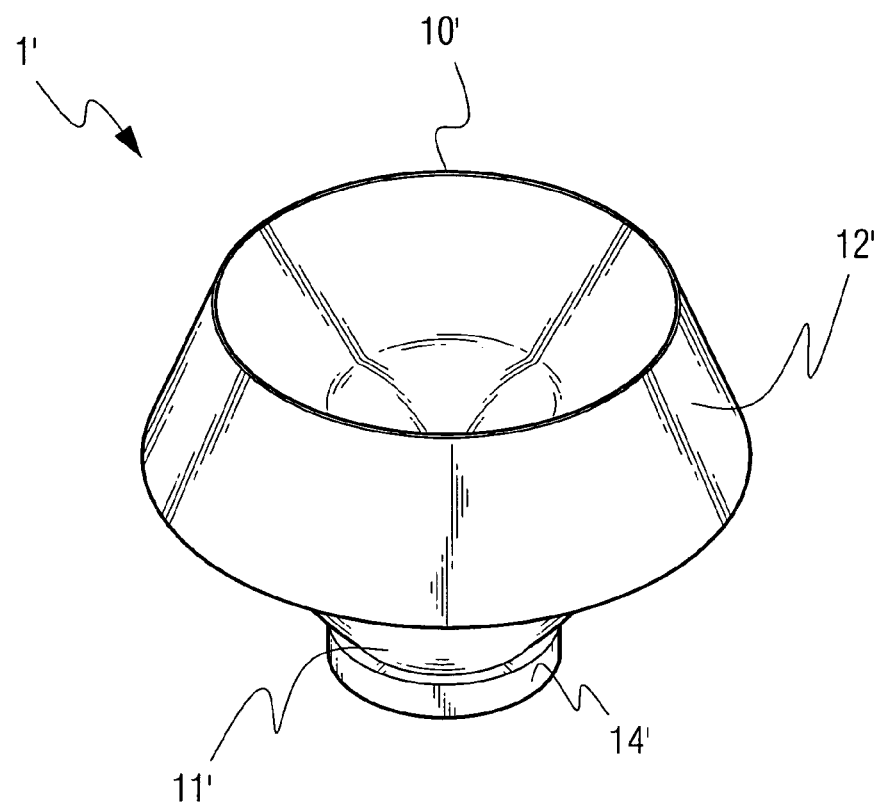
FIG. 2A is a three-dimensional view of a lens used for an LED according to another exemplary embodiment of the present invention.
Figure 2B:
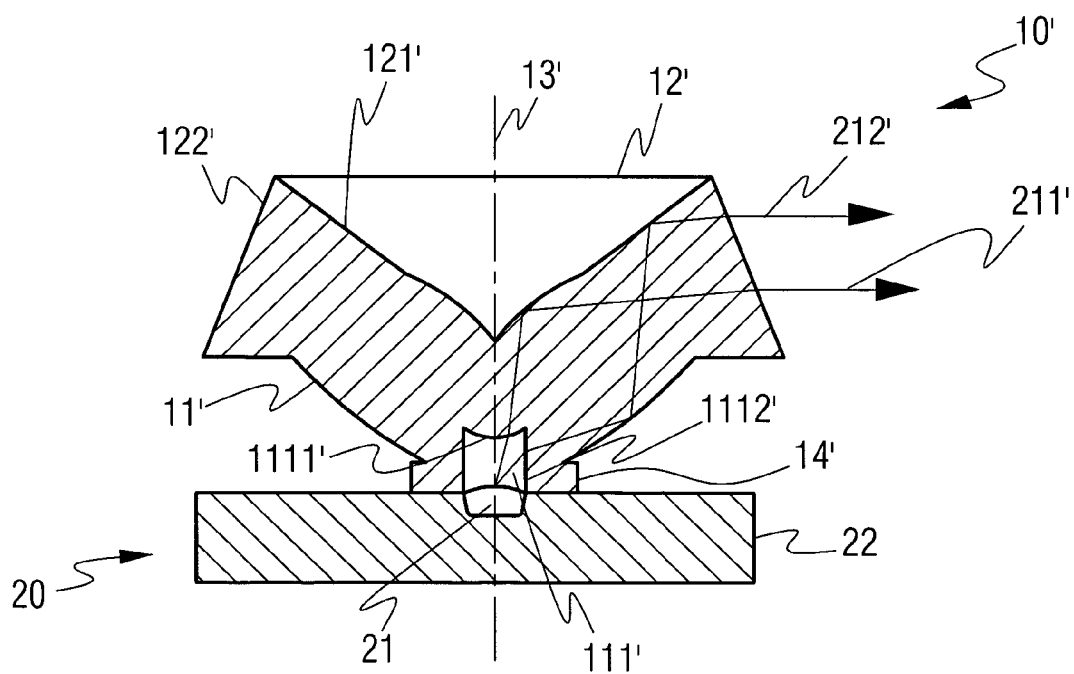
FIG. 2B is a cross-sectional view of a lens used for an LED according to another exemplary embodiment.

In the second embodiment, the lens of the second embodiment has identical parts with the lens of the first embodiment, but the second lens part 12' may be of other shapes, for example, as shown in FIGS. 2A and 2B, the second lens part 12' of lens 1' is approximately M-shaped. But, the second lens part 12' includes a V-shaped portion 121' containing the central axis 13' on its middle and a linear portion 122' extending outward from the central axis 13' and keeping an angle with the central axis 13. Therefore, another shape of the second lens part 12' is formed.

A lens 1, 1' used for an LED according to exemplary embodiments of the present invention may be made of a transparent material by means of diamond turning, injection molding, precision grinding, or casting.

The lens 1, 1' used for an LED described above is mounted onto the light source package 20, 20' through the retaining part 14, 14'. Further the lens 1, 1' may be integrated with the light source package 20, 20', and the LED 21 may be a red LED, a blue LED, a green LED, or a white LED.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lens used for a light-emitting diode (LED), comprising a body containing a central axis and symmetrical about the central axis, the lens being mounted onto the LED, the lens further comprising:
   a first lens part with a light guide housing, the light guide housing including a first light guide surface and a second light guide surface, the first light guide surface being a concave surface facing upward for focusing light rays from the LED, the second light guide surface refracting the light rays from the LED, the first lens part totally reflecting light rays from the second light guide surface so that most light rays emitted from the first lens part are parallel to the central axis; and
   a second lens part opposite to the first lens part, for totally reflecting the light rays from the first lens part and entered into the second lens part, so that light emitted from the second lens part are approximately perpendicular to the central axis.

2. The lens used for an LED of claim 1, further comprising a retaining part for mounting the lens on the LED.

3. The lens used for an LED of claim 2, wherein the retaining part is perpendicular to the axis.

4. The lens used for an LED of claim 1, wherein the lens is produced through a diamond turning.

5. The lens used for an LED of claim 1, wherein the lens is produced through an injection molding.

6. The lens provided for an LED of claim 1, wherein the lens is produced through a casting.

7. The lens used for an LED of claim 1, wherein the lens is produced through a precision grinding process.

8. The lens used for an LED of claim 1, wherein the LED is a red LED, a blue LED, a green LED, or a white LED.

9. The lens used for an LED of claim 1, wherein the second lens part has a V-shape portion containing the central axis on its middle and a linear portion extending outward from the V-shape and paralleling to the central axis.

10. The lens used for an LED of claim 1, wherein the second lens part has a V-shaped portion containing the central axis on its middle and a linear portion extending outward from the central axis and keeping an angle with the central axis.

11. The lens used for an LED of claim 1, wherein the first lens part is about bowl-shaped.

12. The lens used for an LED of claim 1, wherein the second lens part is about M-shaped.

13. The lens used for an LED of claim 1, wherein the lens is made of transparent materials.

14. The lens used for an LED of claim 1, wherein a fluorescent material is applied to a light output surface of the second lens part.

* * * * *